US012647448B2

(12) United States Patent
Barazandeh et al.

(10) Patent No.: US 12,647,448 B2
(45) Date of Patent: Jun. 2, 2026

(54) METHODS FOR HOST AND USER RISK COMPUTATION IN SECURITY INFORMATION AND EVENT MANAGEMENT SYSTEMS

(71) Applicant: Fortinet, Inc., Sunnyvale, CA (US)

(72) Inventors: Babak Barazandeh, Sunnyvale, CA (US); Partha Bhattacharya, Sunnyvale, CA (US)

(73) Assignee: FORTINET, INC., Sunnyvale, CA (US)

( * ) Notice: Subject to any disclaimer, the term of this patent is extended or adjusted under 35 U.S.C. 154(b) by 93 days.

(21) Appl. No.: 18/544,001

(22) Filed: Dec. 18, 2023

(65) Prior Publication Data

US 2025/0202920 A1     Jun. 19, 2025

(51) Int. Cl.
*H04L 9/40*          (2022.01)

(52) U.S. Cl.
CPC .............................. *H04L 63/1433* (2013.01)

(58) Field of Classification Search
CPC ..................................................... H04L 63/1433
USPC ............................................ 726/25; 709/224
See application file for complete search history.

(56) References Cited

U.S. PATENT DOCUMENTS

| | | | |
|---|---|---|---|
| 10,356,044 B2 | 7/2019 | Liang | |
| 10,534,912 B1 * | 1/2020 | Youngberg | G06F 21/577 |
| 11,700,269 B2 | 7/2023 | Mugambi et al. | |
| 2016/0232359 A1 * | 8/2016 | Carpenter | G06F 8/71 |
| 2018/0068241 A1 * | 3/2018 | Varkey | G06Q 10/0635 |
| 2021/0303682 A1 | 9/2021 | Mugambi et al. | |
| 2024/0267400 A1 * | 8/2024 | Gazit | G06F 21/552 |
| 2024/0356973 A1 * | 10/2024 | Andrzejewski | H04L 41/22 |
| 2025/0094582 A1 * | 3/2025 | Bhatia | G06F 21/564 |

* cited by examiner

*Primary Examiner* — Liang Che A Wang

(74) *Attorney, Agent, or Firm* — Jaffery Watson Hamilton & DeSanctis LLP

(57) ABSTRACT

Various embodiments provide systems and methods for computing risk scores for entities (e.g., hosts, users) in a network. A computer-implemented method includes determining incidents during a first time period for an entity of the network, calculating rarity for all incidents for the entity in the network using a first function, and updating severity for all incidents of the entity based on a confidence score for the incident using a second function.

20 Claims, 7 Drawing Sheets

METHOD
400

401
DETERMINING INCIDENTS PER ENTITY OF A NETWORK

402
CALCULATING RARITY FOR INCIDENTS PER ENTITY IN THE NETWORK USING A FIRST FUNCTION (F1) (E.G., OBTAIN A COUNT FOR EACH INCIDENT AND GENERATES ITS RARITY VALUE)

404
UPDATING SEVERITY FOR ALL INCIDENTS BY THEIR CONFIDENCE SCORE USING A SECOND FUNCTION (F2)

406
UPDATING PER-INCIDENT SCORE BY RARITY AND SEVERITY USING A THIRD FUNCTION (F3)

408
ADDING INCIDENT SCORE PER ENTITY (E.G., PER-HOST, PER-USER) AND PASSING RESULTING OUTPUT THROUGH A FOURTH FUNCTION (F4)

410
DETERMINING A FINAL RISK SCORE FOR EACH ENTITY BY COMBINING A SCORE FROM A PREVIOUS TIME-SLOT AND A CURRENT ESTIMATED SCORE FOR A CURRENT TIME-SLOT USING A FIFTH FUNCTION (F5)

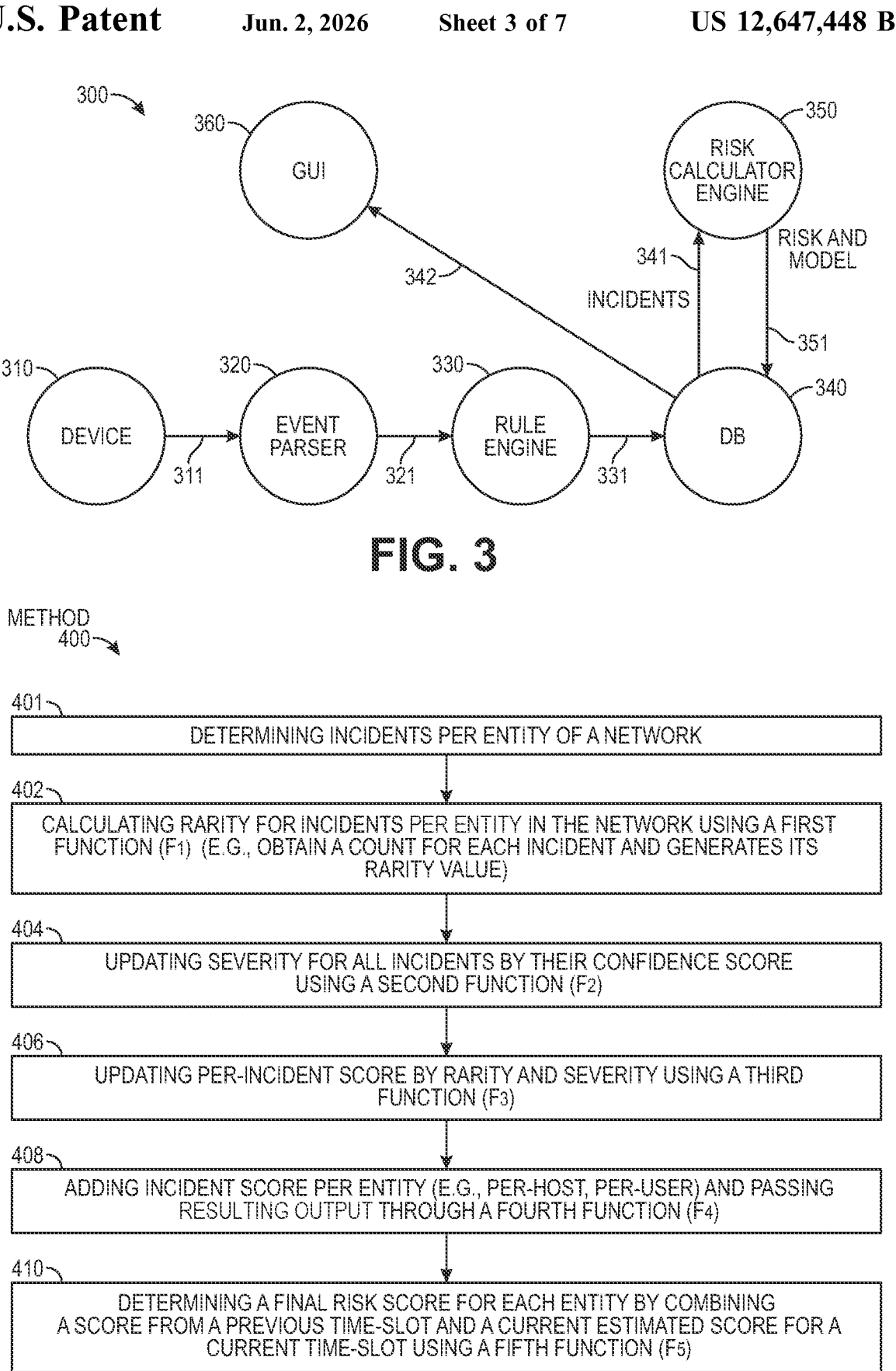

FIG. 3

METHOD
400

| |
|---|
| 401 DETERMINING INCIDENTS PER ENTITY OF A NETWORK |

| |
|---|
| 402 CALCULATING RARITY FOR INCIDENTS PER ENTITY IN THE NETWORK USING A FIRST FUNCTION (F1) (E.G., OBTAIN A COUNT FOR EACH INCIDENT AND GENERATES ITS RARITY VALUE) |

| |
|---|
| 404 UPDATING SEVERITY FOR ALL INCIDENTS BY THEIR CONFIDENCE SCORE USING A SECOND FUNCTION (F2) |

| |
|---|
| 406 UPDATING PER-INCIDENT SCORE BY RARITY AND SEVERITY USING A THIRD FUNCTION (F3) |

| |
|---|
| 408 ADDING INCIDENT SCORE PER ENTITY (E.G., PER-HOST, PER-USER) AND PASSING RESULTING OUTPUT THROUGH A FOURTH FUNCTION (F4) |

| |
|---|
| 410 DETERMINING A FINAL RISK SCORE FOR EACH ENTITY BY COMBINING A SCORE FROM A PREVIOUS TIME-SLOT AND A CURRENT ESTIMATED SCORE FOR A CURRENT TIME-SLOT USING A FIFTH FUNCTION (F5) |

UPDATE
HOUR
⟋ 820

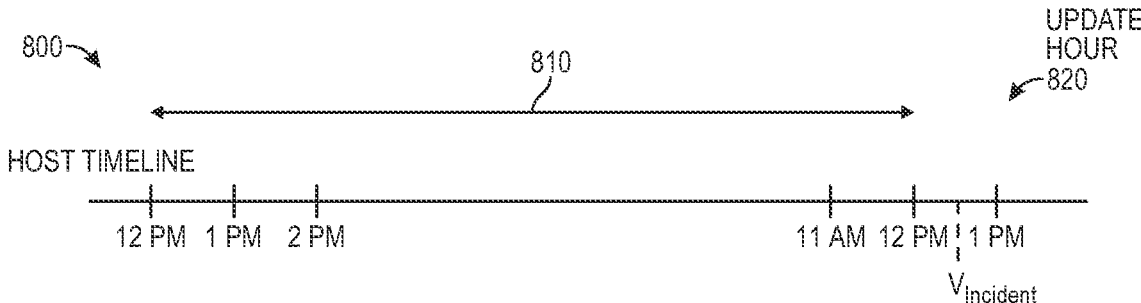

HOST TIMELINE

12 PM  1 PM  2 PM            11 AM  12 PM ¦ 1 PM $V_{Incident}$

FIG. 8A

METHOD
850 ⟍

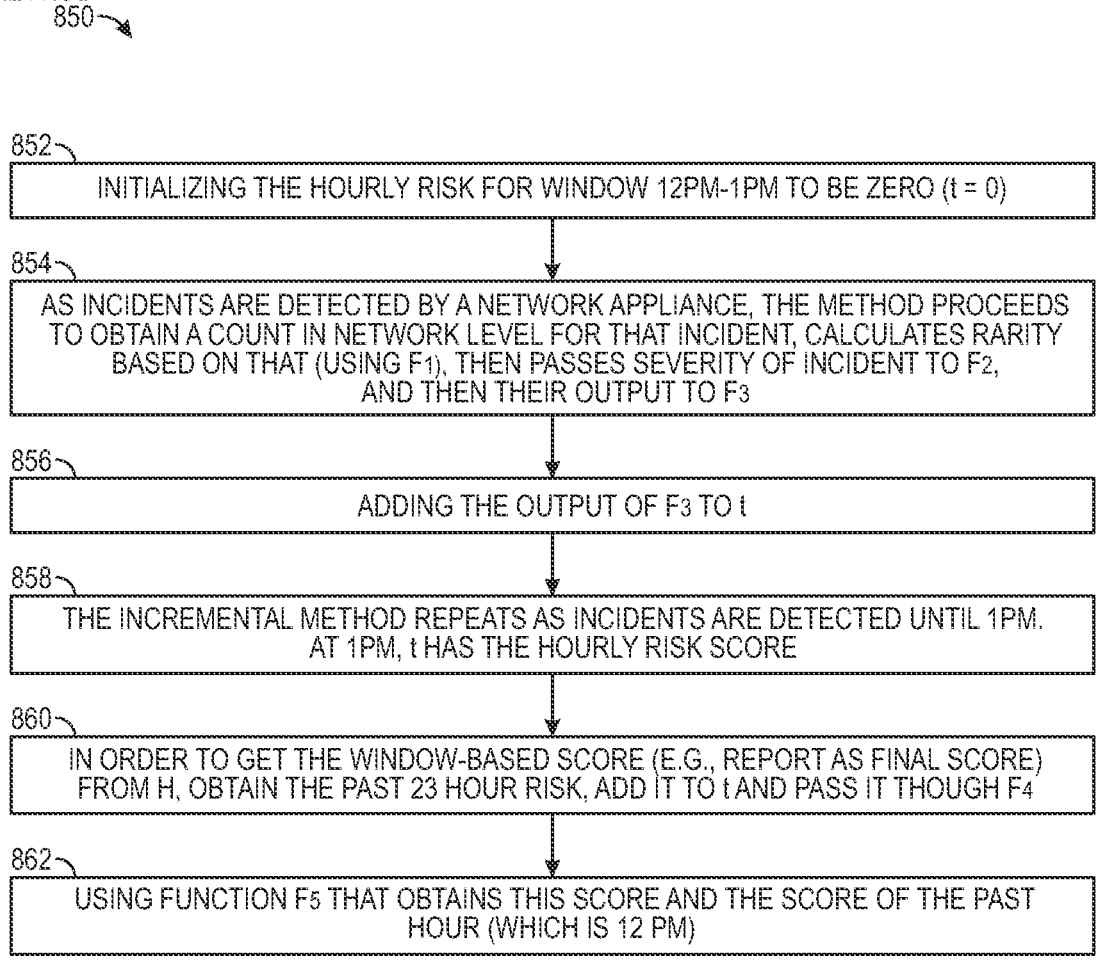

852 ⟍ INITIALIZING THE HOURLY RISK FOR WINDOW 12PM-1PM TO BE ZERO (t = 0)

854 ⟍ AS INCIDENTS ARE DETECTED BY A NETWORK APPLIANCE, THE METHOD PROCEEDS TO OBTAIN A COUNT IN NETWORK LEVEL FOR THAT INCIDENT, CALCULATES RARITY BASED ON THAT (USING $F_1$), THEN PASSES SEVERITY OF INCIDENT TO $F_2$, AND THEN THEIR OUTPUT TO $F_3$

856 ⟍ ADDING THE OUTPUT OF $F_3$ TO t

858 ⟍ THE INCREMENTAL METHOD REPEATS AS INCIDENTS ARE DETECTED UNTIL 1PM. AT 1PM, t HAS THE HOURLY RISK SCORE

860 ⟍ IN ORDER TO GET THE WINDOW-BASED SCORE (E.G., REPORT AS FINAL SCORE) FROM H, OBTAIN THE PAST 23 HOUR RISK, ADD IT TO t AND PASS IT THOUGH $F_4$

862 ⟍ USING FUNCTION $F_5$ THAT OBTAINS THIS SCORE AND THE SCORE OF THE PAST HOUR (WHICH IS 12 PM)

METHODS FOR HOST AND USER RISK COMPUTATION IN SECURITY INFORMATION AND EVENT MANAGEMENT SYSTEMS

COPYRIGHT NOTICE

FIELD

Embodiments discussed generally relate to systems and methods for Host and User Risk Computation in Security Information and Event Management Platforms.

BACKGROUND

In recent years, technology has developed to address new security issues because of rapid evolution in the field of information technology. In Security Information and Event Management (SIEM) platforms, rules act as guiding principles to monitor system behavior. Rule violations trigger incidents, which are then investigated further for corrective actions. These rules can be based on event correlation, typically defined by users, or generated automatically through machine-learning techniques to identify irregularities in event data. For Organizations with a large number of hosts and users, a large number of incidents can be generated. However, not every incident necessitates immediate investigation. Without a structured way to assess the risk of individual hosts and users, administrators can be overwhelmed by the sheer number of incidents.

SUMMARY

Various embodiments provide systems and methods for computing risk scores for entities (e.g., hosts, users) in a network. A computer-implemented method includes determining incidents during a first time period for an entity of the network, calculating rarity for all incidents for the entity in the network using a first function, and updating severity for all incidents of the entity based on a confidence score for the incident using a second function.

In some embodiments, a system includes a processing resource and a non-transitory computer readable medium coupled to the processing resource and having stored therein instructions that when executed by the processing resource cause the processing resource to: determine incidents during a first time period for the entity of the network; calculate rarity for the incidents for the entity in the network using a first function; utilize machine learning to generate true positive confidence values for a confidence score for each incident for the entity; and update severity for the incidents of the entity based on the confidence score for each incident for the entity using a second function.

In some embodiments, a non-transitory computer readable medium having stored therein instructions that when executed by the processing resource cause the processing resource to: determine incidents during a first time period for the entity of the network; calculate rarity for the incidents for the entity in the network using a first function; utilize machine learning to generate true positive confidence values for a confidence score for each incident for the entity; and update severity for the incidents of the entity based on the confidence score for each incident for the entity using a second function.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIG. 3 illustrates a system design for processing of events receiving by a SIEM device in accordance with one embodiment;

FIG. 4 illustrates operations of a method for obtaining entity-based risk score in simple form in accordance with one embodiment;

FIG. 8A shows a timeline and FIG. 8B shows operations of an incremental method of computing risk score for a given entity.

DETAILED DESCRIPTION

Figure 1:
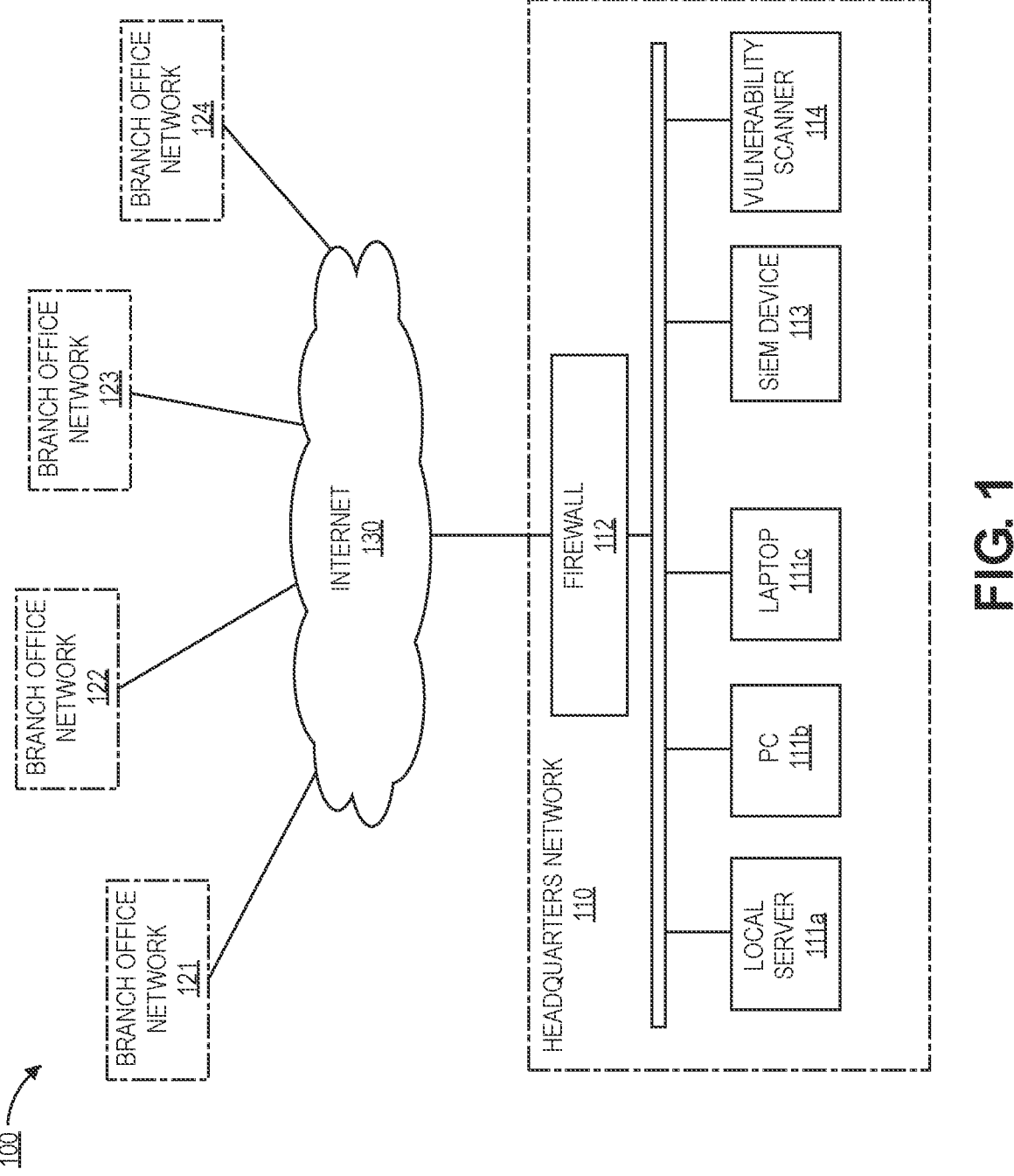
FIG. 1 illustrates an exemplary network architecture 100 in accordance with one embodiment.

Various embodiments provide systems and methods for computing risk scores for entities (e.g., hosts, users) in a network. Novel features of the present design offer new dimensions for calculating risk. The present design utilizes a pipeline design of functions (e.g., rarity mapping function, true positive mapping function, raw score mapping function, total score mapping function, momentum function), instead of a single formula.

Without a structured way to assess the risk of individual hosts and users, administrators can be overwhelmed by the sheer number of incidents. With a good risk metric, administrators can simply address the most risky hosts and users.

To solve this problem, a mathematical method for computing risk scores for each entity (e.g., host or user) is provided, factoring in key variables that influence this score. The present design offers several key benefits as follows below.

Addressing Initialization Challenges

Traditional machine learning algorithms often depend on accurate initial settings to kick-start effective learning. In SIEM applications, especially in entity risk scoring, obtaining such initial settings can be difficult, which limits the usability of conventional machine learning methods. The mathematical method of the present design, grounded in algebraic principles, provides a novel solution for this problem that lacks easily obtainable initial values. This unique feature distinguishes it from standard machine learning approaches, allowing it to solve problems previously considered unapproachable due to initialization issues.

Handling Dynamic Feature Changes

One major challenge in this area is the ever-changing nature of the feature space. Rules can be modified, added, or removed by users on a constant basis. As a result, feature space generated based on an assumed rule set, needs to be updated each time users make changes to rules. One approach might be developing features that rely only on simple statistics about data. However, their simple nature avoids machine learning modeling to learn the major impacting features. The present design, relies on statistics that can be easily calculated for each organization and can adapt themselves easily to any change to rules created by users. Additionally, these features have shown strong evidence to calculate the proper score for each entity.

Reducing Computational Requirements

Another concern is the computational power needed to train complex machine learning models, particularly as more sophisticated structures like large-scale neural networks become prevalent. This computational demand is a major bottleneck in SIEM systems. The mathematical method diverges significantly from this trend. It operates efficiently without requiring extensive computational resources. Furthermore, the present design uses a technique that applies composite functions in a distributed manner for each entity, which alleviates the required time for inference in complex architectures. This efficiency makes the framework of the present design highly suitable for real-time applications where quick responses are crucial.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. Such network security devices may include, but are not limited to, network firewall devices and/or network gateway devices. While there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

FIG. 1 illustrates an exemplary network architecture 100 in accordance with one embodiment. In the context of the present example, network architecture 100 comprises a headquarters network 110 and multiple branch office networks 121, 122, 123 and 124. Headquarters network 110 and branch office networks 121, 122, 123 and 124 are connected through internetworks, such as the Internet 130. Headquarters network 110 comprises multiple network appliances, such as a local server 111*a*, a PC 111*b*, a laptop 111*c* and other computing devices that are operatively coupled to each other through a Local Area Network (LAN), wherein the LAN is then operatively coupled with a firewall 112 that enables access to Internet 130. Firewall 112 separates the external computing environment, represented by Internet 130, from the internal computing environment of headquarters network 110. Firewall 112 may intercept communications between Internet 130 and network appliances of headquarters network 110 and scan for malware, viruses or other high risk network accesses. The internal structures of branch office networks 121-124 are omitted as they may be the same as that of headquarters network 110.

In the current example, a security information event management (SIEM) device 113 is connected to headquarters network 110. SIEM device 113 may schedule vulnerability scanner 114 of headquarters network 110 and other vulnerability scanners of branch office networks 121-124 to scan computing/networking devices of the networks for vulnerabilities. Vulnerability scanner 114 may be any kind of vulnerability management devices that may be used for identifying and mitigating vulnerabilities that exist in computers or other network appliances. Further, SIEM device 113 may schedule other security devices of networks to conduct other security tasks. These security devices may include, but are not limited to, firewalls, intrusion detection systems (IDSs), Web application firewalls (WAFs), system or Web scanning devices, Distributed Denial of Service (DDoS) mitigation appliances, anti-spam devices, anti-spam devices that protect the networks. The security tasks include scanning for newly added devices and/or new services, configuring and/or conducting network policies for controlling accesses to a network and/or scanning/cleaning virus/spam at computing devices. These security devices may conduct the security tasks at one or more network layers and record the results of the tasks in their logs. The logs may be sent to SIEM device 113 in real time or periodically by these security devices.

Although in the present example, SIEM device 113 is located at headquarters network 110, those of ordinary skill in the art will appreciate that SIEM device 113 may located within any of the networks 110 or 121-124. It will also be appreciated by one skilled in the art that SIEM device 113 may be a cloud-based SIEM device that schedules security tasks and collects logs from the security devices of all internal networks. SIEM device 113 analyzes the logs from different security devices and sends out an alarm to the administrator of SIEM device 113 when abnormal activity is detected. SIEM device 113 may also provide a report to the administrator regarding the status of the whole network, such as total number of attacks detected within a particular time period and the distribution of sources and targets of the attacks.

SIEM devices are useful to the administrator of a large network, which may include hundreds of computing devices distributed among different locations. However, existing SIEM devices schedule security tasks independently because the security tasks conducted by security devices from different manufactures require different parameters when scheduled and the results of the security tasks are also in different formats. Although some tasks may be logically connected and may be sequentially conducted to carry out a complex task, the administrator of existing SIEM devices has to schedule these tasks manually. For example, when the administrator wants to add a new website to the network, a host discovery task is scheduled to discover a newly added host. Then, the administrator checks the result of the host discovery. If a new host is found, a test Hypertext Transfer Protocol (HTTP) service task is scheduled to verify if an HTTP service is provided by the new host. If an HTTP service is found on the new host, an HTTP service scan task is conducted to verify if any leakage exists in the HTTP service. When the HTTP service is verified, then the new HTTP service may be added to the network. The above mentioned host discovery task, test HTTP service task and HTTP service scan task are scheduled manually by the administrator because the task may be conducted by security devices from different manufacturers and results of the security tasks cannot be transferred to other tasks.

Figure 2:
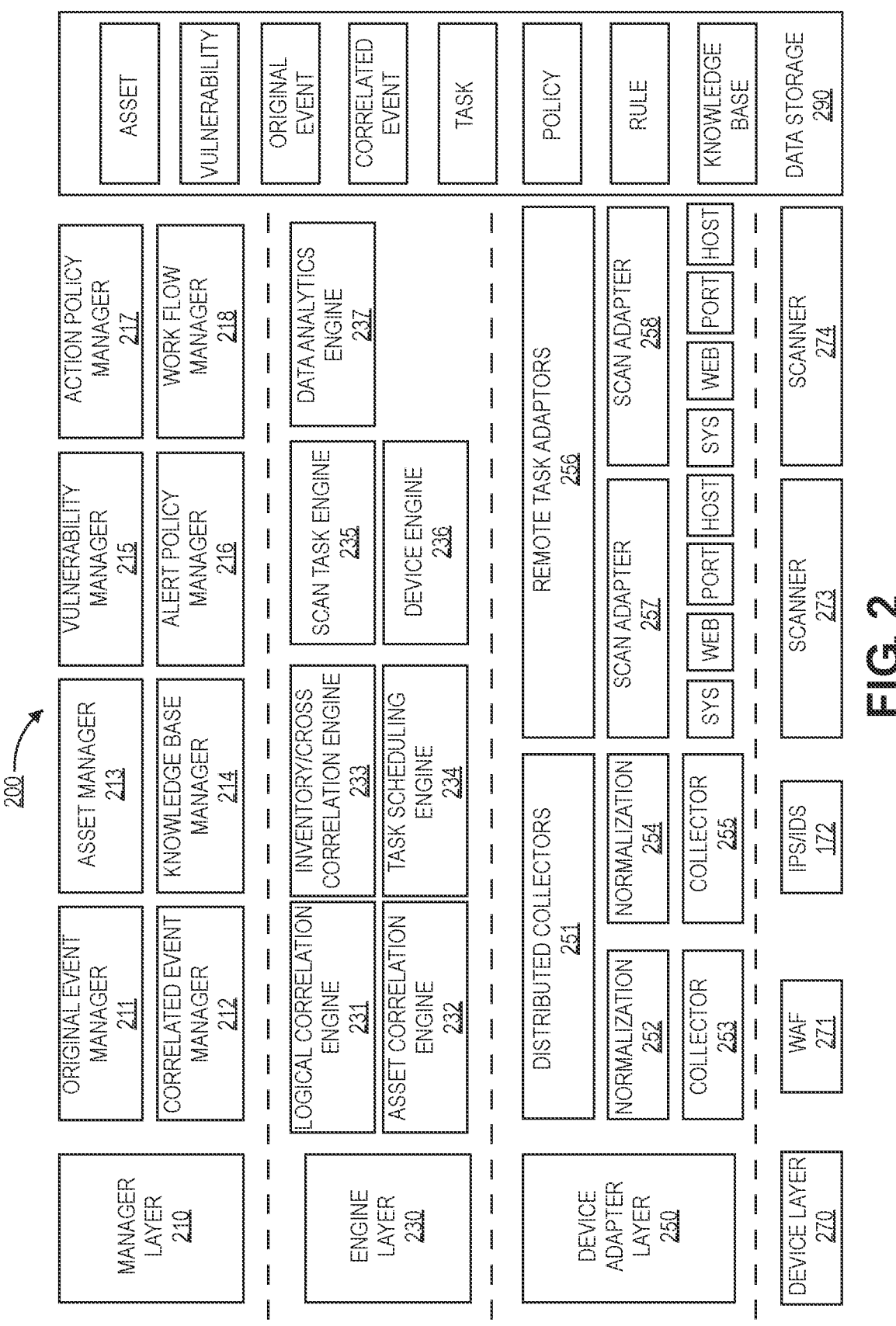
FIG. 2 illustrates exemplary functional units of an SIEM device 200 in accordance with one embodiment.

FIG. 2 illustrates exemplary functional units of a network appliance 200 (e.g., SIEM device 200) in accordance with one embodiment. In the present example, SIEM device 200 comprises a manager layer 210, an engine layer 230, a device adapter layer 250 and a device layer 270. Each of these layers represents a group of modules that conduct corresponding functions at different levels. SIEM device 200 further comprises a data storage 290. Data storage 290 comprises multiple data tables, such as asset tables, vulnerability tables, original event tables, correlation event tables, task tables, policy tables, rule tables, knowledge base and etc. Each module of SIEM device 200 may access corresponding tables of data storage 290 for managing corresponding data.

Manager layer 210 represents interface modules that are used for managing the configuration and scheduling of other engines, adapters or devices of SIEM device 200 to conduct work flows. At manager layer 210, SIEM device 200 includes an original event manager 211, a correlated event manager 212, an asset manager 213, a knowledge base manager 214, a vulnerability manager 215, an alert policy manager 216, an action policy manager 217 and a work flow manager 218.

Original event manager 211 is used for managing original events as well as work flow results collected from security devices that are managed by SIEM device 200. Security devices, such as WAF 271, IPS/IDS 272 and scanners 273 and 274, may collect original events while inspecting network activities. These security devices may also conduct tasks scheduled by task engine 235 based on a work flow. The original events may be monitored by data analytics engine 237 for any abnormal network activities. The original events and results of tasks may be logged and fed back to logical correlation engine 231, inventory/cross correlation engine 233 or data analytics engine 237 for further analyzing. Original event manager 211 may configure rules that devices at device adapter layer 250 may use for controlling particular events and/or data that should be collected and how the collected data or events are to be fed back.

Correlated event manager 212 is used for defining the correlations of the original events collected by devices at device adapter layer 250. In some cases, the same event may be captured and logged by multiple security devices and SIEM device 200 may receive multiple original events for the same events. In some other cases, different events are captured by different security devices and these events may be associated with the same attack. These events relating to the same attack may be connected to form a complete attack procedure. Correlated event manager 212 is used for defining the rules for conducting multiple correlation processing, such as logical correlation, asset correlation, inventory correlation, cross correlation and knowledge correlation.

Asset manager 213 is used for managing asset attributes of networks managed by SIEM device 200. Asset manager 213 may create and update one or more asset tables in data storage 290 to register all or core assets of the network(s). Each of the assets or core assets may be assigned an asset value. A risk level of an event may be set and adjusted based on an asset value and/or other attributes of the target of the event in the network. If the target of the event is a core asset of the network, the calculated risk level of the event may result in a higher value relative to a calculated risk level of a non-core asset. For example, a web server providing the most important web application for a company would be considered a core asset of the whole network and would typically be assigned a high asset value. When an attack is targeting this web server, the determined risk level of this attack is high and therefore an alarm is more likely to be generated by SIEM device 200. On the other hand, a client PC within the network would typically be considered a non-core asset of the network or may not even be present in the asset list of the network. When an attack is targeting this client PC, the determined risk level is low and therefore no alarm is sent to the administrator.

Knowledge base manager 214 is used for managing a knowledge base of data storage 290. Knowledge base manager 214 may collect and store information, including, but not limited to, services, protocol, ports, firmware, operation systems, patches, plug-ins and the like, that relate to system vulnerabilities, viruses and/or network attacks. When an attack is caught by a security device, SIEM device 200 may search knowledge base to find corresponding vulnerabilities related to the attack at issue. If a vulnerability relating to the attack is found in knowledge base, a correlation engine may invoke inspection or scanning tools to scan a target host for the corresponding vulnerability.

Vulnerability manager 215 is used for recording vulnerabilities that are exploited by attacks in a vulnerability ID DB. Attributes of attacks, including, but not limited to, information contained within the Common Vulnerabilities and Exposures (CVE) system, BugTraq or S3CVE, may be stored in vulnerability ID DB. When a security event is received by a cross correlation engine, the corresponding vulnerability of the security event is searched for within vulnerability ID DB. If cross correlation engine identifies a correlation between the attack and vulnerability based on standard attributes, it may invoke inspection or scanning tools to scan the target host for the corresponding vulnerability.

Alert policy manager 216 is used for managing the policies that regulate alarm actions when security events are received. Usually, the private/internal networks managed by SIEM device 200 may deploy multiple security devices at different locations. These security devices may scan the networking devices of the private/internal networks and manage the access to the network devices from/to a public/external network, such as the Internet. These security devices may report network activities or security events they captured periodically or in real time. Therefore, SIEM device 200 may receive numerous security events from the security devices. To avoid too many alarm messages, an administrator of SIEM device 200 may set alert policies so that only security events that have high risk levels (such as those representing an attack of a core asset of the network) may trigger an alarm message. Alert policies may further configure persons, time periods, types of warnings that alarm messages may send based on risk levels of security events. The types of warnings may be a syslog sent to a remote terminal or an electronic mail (Email) or Short Message Service (SMS) message.

Action policy manager 217 is used for managing actions that SIEM device 200 carries out when particular security events are received. Action policy may include correlated event action policy, web attack action policy, system attack action policy, virus event action policy and audit event action policy. These policies may define tasks or work flows that should be carried out when corresponding events are received by SIEM device 200.

Work flow manager 218 is used for configuring work flows that can be executed by SIEM device 200 to carry out complex tasks. A work flow defines a work flow task that contains a group of tasks that may be sequentially or concurrently conducted by one or more security devices so that a complex function may be accomplished automatically by SIEM device 200. The results of a previous task in the work flow may be used to trigger the next task and the results may be transferred as parameters to the next task. Work flow manager 218 may create a work flow by specifying a series of commands/instructions that are carried out by multiple security devices. Each one in the series of commands/instructions designates a specific task, a host that conducts the specific task and optional parameters needed to conduct the task. The parameters may be the results of previous tasks in the work flow. The parameters may also include logic conditions for triggering the task. By defining a work flow, SIEM device 200 may link multiple security tasks together to accomplish a complex task automatically even though these tasks may be conducted by different security devices potentially from different manufacturers. Each of the work flows created by work flow manager 218 may be saved in a configuration file. A graphic representation may also be used to show the procedure of a work flow so that a user may understand the work flow task more easily. Work flow manager 218 may further configure one or more work flow policies to define the periods that one or more work flows or work flow templates should be executed. The work flow policies may also define one or more security events that may trigger the execution of one or more work flows or work flow templates. A work flow or work flow template may be started by task scheduling engine 234 at a designated time or triggered by a security event based on the corresponding work flow policy.

In some embodiments, a specific work flow is used for particular security devices to carry out a designated work flow task. The commands and/or parameters for scheduling tasks in the work flow are dedicated to the hosts conducting the task. SIEM device 200 uses specific work flows for each security device that are relatively simple to implement. However, specific work flows are not flexible in some scenarios. For example, when different security devices are conducting the same work flow task, multiple or duplicated work flows are created for the different security devices. Further, when a new host is added to the network, new work flows are created for the new host to carry out work flow tasks. Similarly, when an existing host is upgraded/changed, the commands or parameters needed for conducting a task may be changed. All the work flows relating to the changed host should be changed in order to correctly carry out the tasks.

In order to adapt to different network environments, in some embodiments, work flow manager 218 may also be used for configuring work flow templates that can be conducted by SIEM device 200. A work flow template defines a general work flow task that contains a group of abstract tasks describing functions needed to be conducted by multiple security devices so that a complex function may be accomplished automatically. A work flow template does not designate the specific tasks or specific hosts that should be scheduled to conduct tasks when the work flow template is created. A work flow template may use descriptors to define abstract tasks to be executed in the work flow. Descriptors may define the name, parameters and logical conditions of an abstract task without designating specific tasks or specific hosts for executing the tasks. At the time a work flow template is scheduled to be executed, a device engine may be used for translating the descriptors of an abstract task into specific commands, parameters and logical conditions that are used by the specific hosts for conducting the abstract tasks. In this manner, a work flow instance may be derived from the work flow template by the device engine. A work flow instance may also be conducted by the hosts in the same manner as a specific work flow created directly for the host.

Since a work flow instance is derived from a work flow template by a device engine when or before the work flow template is scheduled to start, it does not need to create the same work flow multiple times for security devices that are desired to conduct the same work flow task. When a security device is added to carry out an existing work flow, it does not need to add a new work flow for the new security device. Rather, a set of commands and parameters for the newly added device may be added to the device engine and a work flow instance for the newly added security device may be derived from the work flow template when needed. Similarly, when an existing security device is upgraded/changed, device engine 236 registers the changed commands and parameters for the existing security device and it does not need to change any work flow template.

Engine layer 230 represents multiple engines of SIEM device 200, wherein each engine drives the execution of work flows or analysis of the results of work flows. In the present example, at engine layer 230, SIEM device 200 comprise a logical correlation engine 231, an asset correlation engine 232, an inventory/cross correlation engine 233, a task scheduling engine 234, a task engine 235, a device engine 236 and a data analytics engine 237.

Logical correlation engine 231 is used for conducting logical correlation to the original events so that related or repeated events may be combined into one security event. Original events may be captured by different security devices at different locations, different network segments and different network layers. In some cases, the same event may be captured and logged by multiple security devices and SIEM device 200 may receive multiple original events for the same event. In some other cases, different events are captured by different security devices and these events may be associated with the same attack. These events relating to the same attack may be connected to form a complete attack procedure. After logical correlation, one security event may be extracted from the repeated or related original events and others events may be discarded. Alternatively, instead of extracting one event from repeated or related events, a new security event may be generated to represent the repeated or related original events.

Asset correlation engine 232 is used for conducting asset correlation among the security events and the assets of a network so that only security events relating to core network assets will generate notifications to the administrator of the network or trigger a work flow. To conduct the asset correlation, asset table may be setup to register all or a subset of assets (e.g., core assets) of the network. In one embodiment, each asset is provided with an asset value representing the importance of the asset to the network. When a core asset that has a high asset value is under attack, a high risk level is associated with the security event and an alarm is more likely to be generated to warn the administrator or trigger a work flow to conduct a virus/vulnerability scan of the network.

Inventory/cross correlation engine 233 may further adjust the risk level of the security event based on whether a vulnerability that an attack is targeting exists in the target host. SIEM device 200 may maintain an inventory table that registers the attributes of assets of the network. When an attack needs a particular network environment while the target of the attack is running in that network environment, it means that the attack may affect the target and Inventory/cross correlation engine 233 may adjust the risk level of the attack. Inventory/cross correlation engine 233 may further adjust the risk level of an attack based on whether a vulnerability that an attack is targeting exists in the target host based on the vulnerability ID DB or knowledge base. Logical correlation engine 231, asset correlation engine 232 and inventory/cross correlation engine 233 are described in U.S. Pat. No. 10,616,258 that is assigned to the same assignee as the present application. The related U.S. Pat. No. 10,616,258 is hereby incorporated by reference in its entirety for all purposes.

Task scheduling engine 234 is used for launching work flows at the times designated by the work flow policies. When a work flow is to be launched/triggered, tasks in work flows or work flow templates are extracted by task scheduling engine 234. Then, the extracted tasks are sent to task engine 235 for execution. In some embodiments, after a task in a work flow is executed by task engine 235, the results of the task are fed back to task scheduling engine 234. Then, task scheduling engine 234 may determine if the results of the task may trigger a next task based on one or more logical conditions defined in the work flow. Upon a determination that the next task should be triggered, the next task is sent to task engine 235 for execution.

Task engine 235 is used for driving the execution of tasks and collecting results of tasks after tasks are executed. When a task of a work flow is received from task scheduling engine 234, task engine 235 connects to the host designated in the task through a corresponding adapter and ports. The task is then executed by the specific host and the results of the task are fed back to the task engine 235 through the adapter and ports. When an abstract task from a work flow template is received from task scheduling engine 234, task engine 235 sends the abstract task to device engine 236 for translation. After a specific task translated by device engine 236 is received by task engine 235, the specific task is executed as described above.

In some embodiments, device engine 236 is used for translating an abstract task into a specific task that can be executed by task engine 235. Device engine 236 may comprise a function table that registers functions or tasks that security devices of SIEM device 200 can execute. The function table may comprise descriptors of tasks and corresponding specific commands/instructions, parameters for executing the tasks of security devices. When an abstract task is received, device engine 236 extracts the descriptors from the abstract task and searches the function table for the descriptors. Then, the descriptors of the abstract task are replaced with specific commands/instructions and parameters of a specific security device so that a specific task is created for execution by the specific security device. The created specific task is fed back to task engine 235 by device engine 236. In other embodiments, device engine 236 may derive a work flow instance from a work flow template by translating the abstract tasks in the work flow template into specific tasks that may be executed by specific hosts.

Data analytics engine 237 is used for analyzing results of a work flow so that a report or an alarm message may be sent out to the administrator based on alert policies. Data analytics engine 237 may further invoke logical correlation engine 231, asset correlation engine 232 and Inventory/cross correlation engine 233 to conduct correlation analyzing to the results of a work flow so that results of the work flow that relate to core network assets may be found and reported to the administrator.

Device adapter layer 250 represents interfacing modules that connect SIEM device 200 and security devices of the network managed by SIEM device 200 for collecting security events from the security devices. The security devices of a large network may be from different manufacturers and may be deployed at various locations. The security devices may have different commands/instructions for remotely calling the tasks. Security event reports and the results of tasks from different security devices may have different formats. Therefore, the adapters allow SIEM device 200 to schedule different security devices to conduct designated tasks and receive security events and results of tasks in uniform formats. In one embodiment, at device adapter layer 250, SIEM device 200 includes distributed collectors 251 and remote task adapters 256. Distributed collectors 251 represent multiple security event collectors, such as collectors 253 and 255. Collectors 253 and 255 are used for collecting original security events from security devices. These original security events from different security devices may contain different contents in different formats. The original security events may be sent to normalization 252 and 254 for normalizing. After normalization, the information that is useful for correlation in the original security events may be retained and saved in a unified format. It will be easier for correlation engines to correlate events from different sources after the original events are normalized.

Remote task adapters 256 represent interfacing modules that connecting SIEM device 200 and security devices of the network managed by SIEM device 200 for executing tasks by the security devices and receiving feedback/results of the tasks from the security devices. In some embodiments, SIEM device 200 may include multiple scan adapters, such as scan adapter 257 and 258. In the present example, scan adapters 257 and 258 further comprises four interfaces for carrying out different scanning tasks, such as a system scan, a web scan, a port scan and a host scan. Those of ordinary skill in the art will appreciate that various other kinds of adapters may be used for connecting other security devices and for executing other tasks.

Device layer 270 represents security devices that are integrated with or connected to SIEM device 200. The security devices may conduct various tasks that may be scheduled locally or remotely by SIEM device 200 based on a work flow or a work flow template. In the present example, device adapter layer 250 includes a WAF 271, an IPS/IDS 272, a vulnerability scanner 273 and a vulnerability scanner 274. These security devices may be from different manufacturers and may have different commands/instructions to be scheduled for executing tasks. These security devices may also report security events, task results/scan results back to SIEM device 200. Those of ordinary skill in the art will appreciate that security devices other than those described with reference to device adapter layer 250 may be integrated with or connected to SIEM device 200. Because the functions and operations of these security devices are well known in the art, detailed descriptions thereof will be omitted.

FIG. 3 illustrates a system design for processing of events receiving by a network appliance (e.g., SIEM device) in accordance with one embodiment. The system 300 includes a network appliance device 310, an event parser 320, a rule engine 330, a database 340, a risk calculator engine 350, and a graphical user interface (GUI) 360. At operation 311, the SIEM device 310 receives events from a network and sends the events to event parser 320. Then, the event parser 320 sends the output at operation 321 to a rule engine 330. The rule engine applies rules and sends output to a database 340 (DB) at operation 331. Then the risk score calculator 350 obtains incidents from DB 340 at operation 341, calculates the risk per incident and outputs risk and also model information (e.g., mappings defined in incremental section) to DB 340 at operation 351. Finally, the GUI 360 receives a score for each host at operation 342 and reports the scores to a user (e.g., an admin, analyst, etc.).

Before proceeding to explain the present design in full detail, the proposed method is summarized below. The present design considers the following metrics to calculate entity score.

Incident severity: This considers how severe the incident is, at a base level.

Incident resolution: This considers whether the incident is a true positive or false positive, with a confidence factor. This parameter is typically specified by the user or predicted by machine learning algorithms based on user feedback from previous incidents.

Incident rarity: This considers how often this incident happens in the network. Rare incidents contribute more towards the risk score.

Incident diversity: This considers how many diverse incidents an entity is associated with and higher diversity leads to higher score.

Asset criticality: For the same set of incidents, a host with a critical role or a user with access to numerous systems receives a higher score compared to others.

The issue of scoring has been extensively researched in the financial sector, particularly in the context of generating credit scores for customers. In these scenarios, there are two aspects that make risk scoring amenable to machine learning based methodologies: (a) the feature space is usually well-defined and easily identifiable, and (b) credit default information is easy to make the machine algorithm amenable to training. However, for security applications, the task of extracting crucial features and accurately modeling them to capture their impact on the final risk score presents a significant challenge due to the feature space being dynamic since rules can be added/deleted/modified frequently, and the scarcity of training data with labelled incidents. This complexity is a primary reason why commercial solutions resort to simple summation of the raw severity of incidents and normalization using constants. Implementing this simplistic methodology necessitates rigorous experimentation to determine appropriate constants, and it offers limited flexibility for incorporating new features.

The methodology of the present design introduces novel features like Incident Rarity and Machine Learning generated True Positive confidence scores. These novel features offer new dimensions for calculating risk. The present design utilizes a pipeline design instead of a single formula. In this framework, scores are either boosted or decreased in a cascading, or compositional, manner. The most critical features impact the score first. Upon progressing through the pipeline, features of lesser importance are applied. This architecture not only provides a nuanced approach to risk scoring but also offers modularity. This architecture easily adapts the risk scoring function by adding, removing, or modifying modules within the overall pipeline. The novel methodology has computational efficiency due to the set of functions being applied to each individual incident up until the final combination stage. This makes our approach extremely efficient. As an example, it can process and score around 60,000 incidents involving approximately 1,000 hosts in less than two minutes on a standard laptop. This efficiency is a significant advantage, particularly when rapid risk assessment is crucial.

FIG. 4 illustrates operations of a method for obtaining entity-based risk score in simple form in accordance with one embodiment. The operations of the method 400 can be performed by a processing resource of a network security appliance/device including a network gateway, a VPN appliance/gateway, a SIEM device, or UTM appliance (e.g., the FORTIGATE family of network security appliances). In summary, the present design relies on rarity of events (e.g., how often an event happens in the network), how reliable is a triggered rule, i.e., its true-positive value, severity for the incident, and also importance of an asset.

At operation 401, the computer-implemented method includes determining incidents per entity of a network. At operation 402, the computer-implemented method includes calculating rarity for incidents per entity in the network using a first function ($F_1$) as defined below (e.g., obtain a count for each incident and generate its rarity value).

At operation 404, the computer-implemented method includes updating severity for the incidents by their confidence score using a second function ($F_2$) as defined below. This function considers whether the incident is a true positive or false positive, with a confidence factor. This parameter is typically specified by the user or predicted by machine learning algorithms based on user feedback from previous incidents.

At operation 406, the computer-implemented method includes updating per-incident score by rarity and severity using a third function ($F_3$) as defined below.

At operation 408, the computer-implemented method includes adding incident score per entity (e.g., per-host, per-user) and passing a resulting summed score through a fourth function ($F_4$) as defined below for adding diversity. In one example, to avoid a very high score for a user, some of the same incidents for a user are applied to a different function (e.g., min (5*square root (incident score), incident score) and then add this output to a total sum.

At operation 410, the computer-implemented method includes determining a final risk score for each entity by combining a score from a previous time-slot and a current estimated score for a current time-slot using a fifth function ($F_5$) to capture momentum effect as defined below. The fifth function can be different for a host versus a user.

Notation and severity range definitions are listed below.

| Notation | Explanation |
|---|---|
| $c_i$ | count of incident i in the network |
| $r_i$ | rarity score for incident i |
| $s_i$ | score assigned to incident of type i |
| $p_i$ | true-positive value for incident i |
| $\gamma_h$ | importance factor for host h |
| $R_h$ | risk score for host h |
| $\delta$ | momentum effect |
| $\Omega$ | highest achievable risk score |
| $\mu$ | bound on negligible risk score |
| $I_h$ | dictionary for host h to get raw score and true-positive value for its incidents in tuple format |
| $I_{uniq}$ | dictionary that gets the incidents and outputs its occurrence |
| $F_1(c_i)$ | rarity score for incident with ci counts in the network |
| $F_2(s_i, p_i)$ | modified score for incident i with true-positive value of $p_i$ |
| $F_3(s_i, r_i)$ | updated score for incident i with rarity $r_k$ |
| $F_4(S_h, \gamma_h)$ | risk score for host with added severity and importance of $S_h$ and $\gamma_h$ |
| $F_5(S_{h,t}, S_{h,t})$ | momentum-based score function for host h |

In some embodiments, the following map shows three different levels of severity: High, Medium and Low.

| Score range | Severity |
|---|---|
| [1-4) | Low |
| [4-8) | Medium |
| [8-10] | High |

Note, the rarity score for incident is considered to be in range [0, 1], 1 for very infrequent rate of incidents, and 0 for very frequent incidents. Notations are defined above without subscript to refer to generic incident or host, i.e., r refers to rarity score in general not a specific incident. Risk score for each host (or user) is calculated in a given time interval. This means any incident and resulting score depends on the time. For simplicity, the time dependency is dropped and only use it when needed such as calculating effect of momentum on the score.

Consider a risk scoring problem in which a group of hosts belonging to an organization receive numerous incidents from different sources. In a large organization, investigating all these hosts and their associated incidents can turn into a time-consuming task, especially considering that some of these hosts might need immediate attention.

To resolve these issues, an algebraic methodology assigns a score for each host. This way, hosts that require immediate attention get a prompt assessment. Hosts and their respective incidents are structured using the following assumptions.

Assumption 1. With a probability denoted as $p \in [0, 1]$, each incident received by the hosts might be a true positive. A low probability suggests a higher chance of the incident been incorrectly triggered.

Assumption 2. Every host receives scores for different levels (e.g., High, Medium and Low). Every incident in each category consists of a tuple of the form (i, c, p) that represent incident's intrinsic score, count and the probability of true-positive occurrence.

Assumption 3. Each host is assigned an importance factor, $\gamma \in [0, 1]$, that reflects the host's level of importance. The closer $\gamma$ is to 1, the more significant the host becomes.

Any approach that is proposed to assign a risk score for hosts requires to satisfy the following behaviors.

The raw score of an incident should not be used as is. Instead, the raw score needs to be adjusted for frequency. Raw score for incidents should be modified such that more frequent incidents get a lower score than very rare ones.

If a host has many occurring incidents, even low, the risk score should be of high value.

Same incidents on different assets should not be treated the same. The higher the host importance, the higher should be the score for the same set of incidents.

To cover all scenarios, a composition of function solution is utilized. In the composition of function solution, incidents inside each host (or user) pass through a sequence of functions, each modifies the score according to some parameters. The advantage of this composition of function solution is being able to easily change an impacting parameter in each function sequence. Additionally, designing a single function that considers all parameters together and generates a final score is a challenging task and requires a large training data point which is not easy to obtain.

Definition for Function 1

Figure 5:
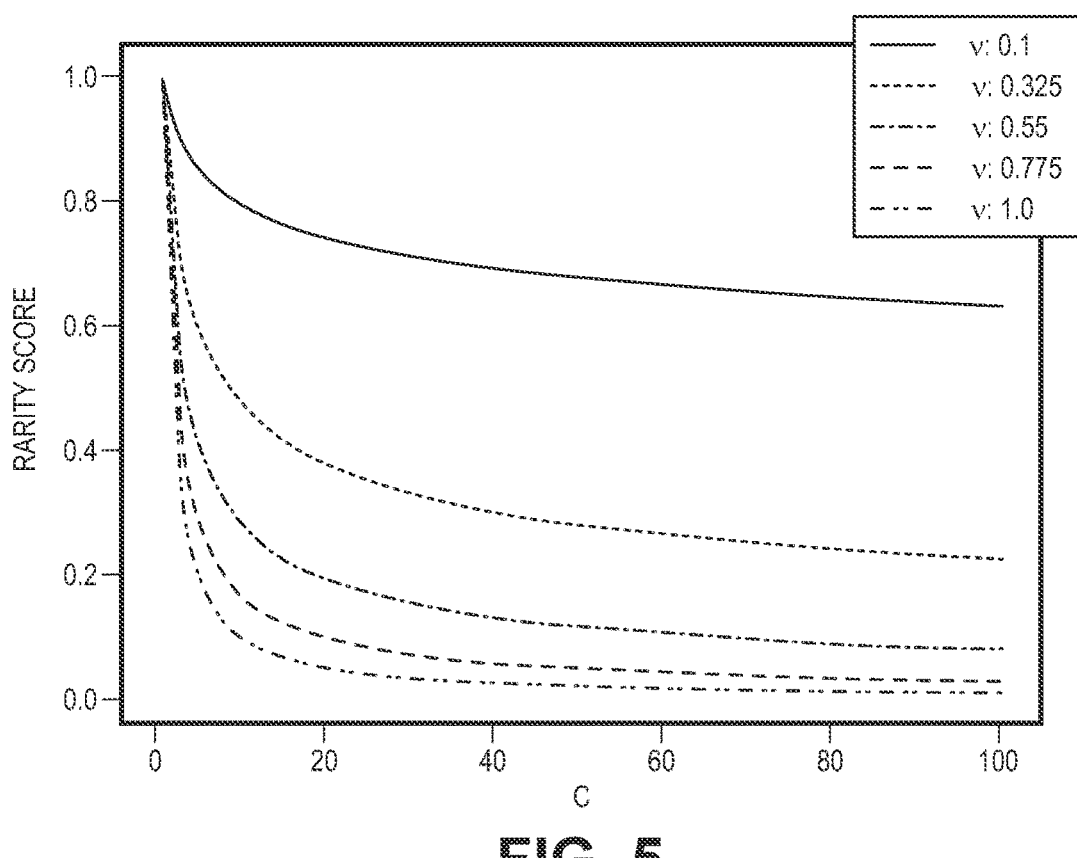
FIG. 5 shows a rarity mapping function using different values of v in accordance with one embodiment.

For rarity mapping, define $F_1(c)$: N [0, 1] that obtains the count for each incident and generates its rarity value. In this method, we define $F_1(c)=c^{-v}$. In our experiments in one example, set the value of $v=0.5$. FIG. 5 shows this function using different values of v.

Definition for Function 2

For true positive mapping, define $F_2$: [0, 10][0, 10] that obtains the severity of each incident and generates its modified value. In this method, define $$F_2(s, p) = ps.$$

Definition for Function 3

For raw score mapping, define $F_3$: [0, 10]×[0, 1]→[$L_i$, $K_iU_i$] that determines intrinsic value of each incident and its rarity and generates a score between [$L_i$, $K_iU_i$] where $L_i$ is the lower bound and $U_i$ is the upper bound for the incident category. Additionally, the multiplier $K_i$ gives the flexibility by allowing severe incidents to increase further.

$$F_3(s, r) = \beta - \alpha e^{-(0.01r+j)i},$$

where $\alpha = (e^{-ji}e^{-(j+0.01)i})^{-1}(K_iU_iL_i)$ and $\beta = \alpha e^{-ji}+i$. Here, $j$ is proportional to the severity of the incidents and controls the rate each incident converges to its upper-bound. Intuitively, for a more severe incident category, the higher this value should be. In one example, the method chooses the following values.

| Score range | L | H | K | j |
|---|---|---|---|---|
| [1-4) | 1 | 4 | 2 | 0.022 |
| [4-8) | 4 | 8 | 4 | 0.043 |
| [8-10] | 8 | 10 | 6 | 0.125 |

Figure 6:
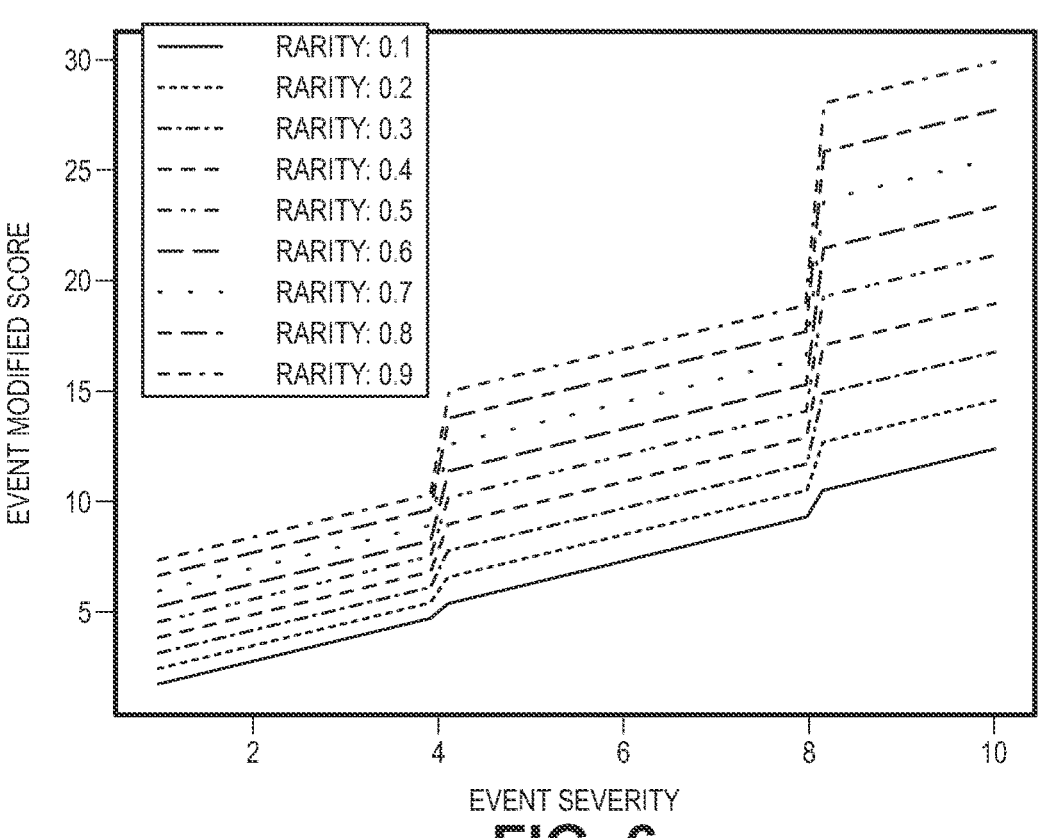
FIG. 6 shows a raw score mapping function using different rarity and even score values.

FIG. 6 shows this function using different rarity and even score values.

Definition for Function 4

For total score mapping, define $F_4(S, \gamma)$: $[0, \infty) \times [0, 1] | \rightarrow [0, \Omega]$ that obtains the sum of all scores belonging to a host and assigns it a risk score. The method assumes $$F_4(S, \gamma) = \begin{cases} 0 & \text{if } S \le \mu \\ \Omega & \text{if } S \ge \Omega \\ \Omega/1 - \Omega^\kappa(1 - S^\kappa) & \text{otherwise} \end{cases}$$

where $\kappa = \max\{\epsilon, (1-\gamma)^\lambda\}$, $\lambda, \epsilon \in (0, 1]$ and $\mu \in (0, \Omega]$. In this function, $\lambda$ controls the effect of host importance. The closer $\lambda$ gets to 1, the higher is the impact of the host importance on boosting the score. To avoid indeterminate form, the method avoids k getting close to 0 which is controlled by the value of $\epsilon$. Additionally, $\mu$ is used to avoid edge cases when the score value gets close to 0. The following table summarizes the values used in the evaluations.

| Parameter | Suggested Value |
|---|---|
| $\epsilon$ | 0.01 |
| $\lambda$ | 1 |
| $\mu$ | 5 |

Figure 7:
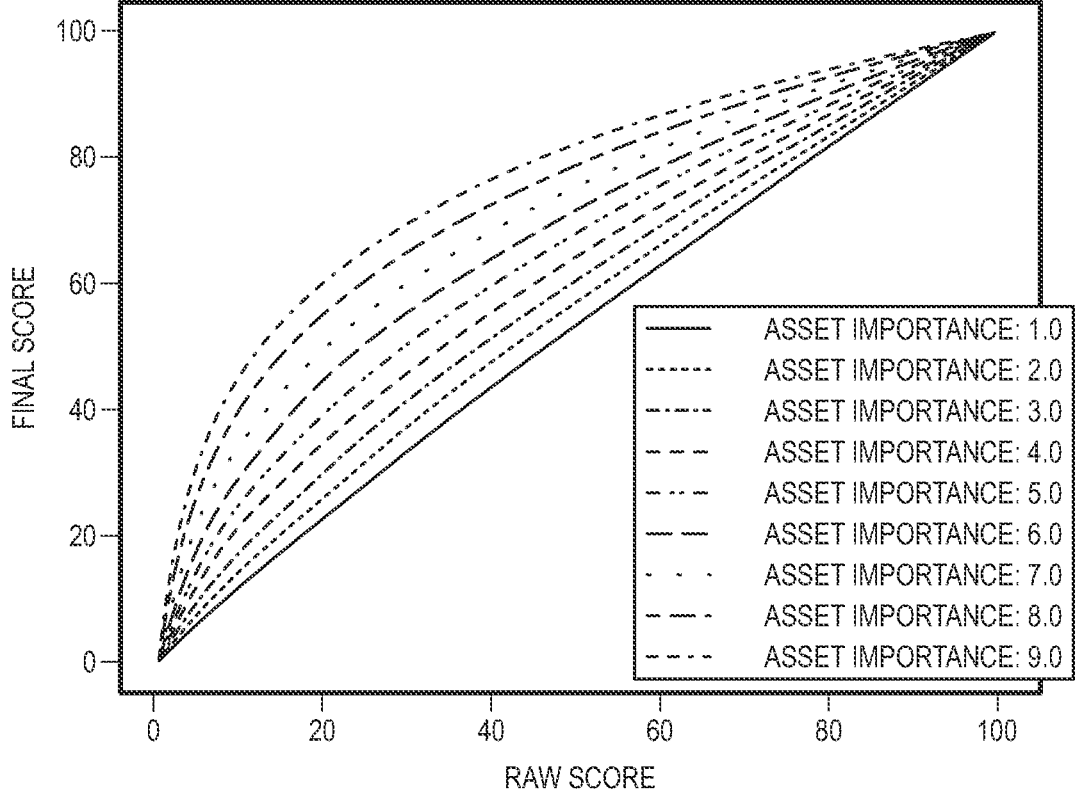
FIG. 7 shows a total score mapping function using different asset importance values.

For total score mapping, FIG. 7 shows this function using different asset importance values. For asset importance impact, an increased asset importance causes a higher boost to the raw score.

Definition for Function 5 (Momentum Effect)

For momentum effect, define $F_5(S_t, S_{t-1})$: $[0, \Omega] \times [0, \Omega] | \rightarrow [0, \Omega]$ that obtains a current and previous host scores and generates a new score. This avoids having the scores change drastically. The method defines $F_5(S_t, S_{t-1}) = \delta S_t + (1-\delta)S_{t-1}$, where $\delta \in [0, 1]$ controls the effect of a previous score on the final host score. In the end-to-end procedure, the method calculates the rarity score for each incident. Then, the method modifies the raw incident score based on the value of a true-positive. The updated scores are passed though another function that modifies the score considering the rarity value. Up to this point, all functions are applied in incident level. Subsequently, the method sums the modified scores for all incidents within each host and passes the scores through another function that modifies the total sum based on the host importance. This generated score is mixed with previous risk score using a linear function to avoid drastic change in score value from a previous score value. The below Algorithm summarize all of these steps.

| Algorithm Host-based risk scoring algorithm (batch form) |
|---|
| Input: $I = \{I_1, \ldots, I_m\}$, $R = \{R_1^0, \ldots, R_m^0\}$, $\Gamma$uniq, $\Gamma$rarity = { } |
| 1:  for $i \in I_{uniq}$ do |
| 2:   $\Gamma$rarity [i] = $F_1$ ($I$uniq [i]) |
| 3:  for $h \in 1 : M$ do |
| 4:   for $i \in I_h$ do |
| 5:    $I_h[i][0] = F_2(I_h[i][0], I_h[i][1])$ |
| 6:    $I_h[i][0] = F_3(I_h[i][0], I_{rarity}[i])$ |
| 7:  for $h \in 1 : M$ do |
| 8:   $R_h = F_4(\sum_{\forall i \in I_h} i)$ |
| 9:   $R_h = F_5(R_h, R^0_h)$ |
| return $\{R_h\}M_{h=1}$ |

In another embodiment, for an Incremental method, the present design includes two windows. A first window is a longer time window (e.g., first time period, 10-30 hours) that the method uses to calculate a whole score and a second window is a shorter time window (e.g., second time period, 30 minutes to 3 hours) that is used to determine how often the method needs to report the score. In one example, the longer time window is 24 hours and the small window is 1 hour for reporting a score. This score is calculated based on all the incidents that happened in the longer time window (past 24 hours). The longer and shorter time windows could be a week and a day, a month, or a week. There is no limitation here.

In a method, when it is time to calculate the score for a given host, the method determines all the incidents that happened in the past 24 hours, calculates a count and resulting rarity, updates their intrinsic severity and sums them up and then passes the total sum through asset importance function (i.e., $F_4$) and momentum function ($F_5$). Since the count and as a result rarity changes based on an incident's activity, the incremental method can not keep records such as the count in previous hours since the final count will change based on activity in the last hour. As a result, this approach results in querying the database every hour to get all incidents in a host. This is computationally expensive.

To overcome this, an incremental method tracks only the counts of each incident in the past 24 hours. In the new hour window, when an incident is generated, the incremental method estimates its count based on the record from the past 24 hours, and uses that as the count and corresponding rarity. This way, the incremental method includes severity and rarity to calculate its boosted score and just adds the risk score of the current hour. Note that there are different ways to estimate the count for the current hour window. One way is simply the average of the past 24 hours. Another way will be using machine learning (ML) to predict the current hour estimate of the count. FIG. 8A shows a timeline and FIG. 8B shows operations of the incremental method for a given host.

A host timeline 800 is shown for the incremental method. A time window 810 represents a past 24 hours. In one example, assume a past 24 hours for a window size (e.g., first time period) and every hour (e.g., second time period) the method provides an updated score based on what happened in that hour. In this case, the updated hour 820 is from 12 PM-1 PM and the past 24 hours is from 12 PM-12 PM. A network level mapping R determines a count for each incident in the network level. A network in this example refers to a collection of all the hosts in an organization. On the host level, a mapping L is a temporary mapping for the host. L tracks a record of the count for each incident in the host and as new incidents are generated, it obtains updates (in the given 12 PM-1 PM) hour. Also, a list H of size 24 holds the past 24 hour risk score. Note that each element in this list is a risk calculated score based on every hour. As mentioned before, final risk at each hour is the sum of risk associated with each hour. H holds the hourly values.

At operation 852, the method 850 initializes the hourly risk for window 12 PM-1 PM to be zero (t=0). At operation 854, as incidents are detected by a network appliance, the method proceeds to obtain a count in network level for that incident during past 24 hours (e.g., R[I]), calculates rarity based on that (using $F_1$), then passes severity of incident to $F_2$, and then their output to $F_3$. At operation 856, the output of $F_3$ is added to t. At operation 858, the incremental method repeats this as incidents are detected until 1 PM. At 1 PM, t has the hourly risk score. At operation 860, in order to get the window-based score (e.g., report as final score) from H, obtain the past 23 hour risk, add it to t and pass it though $F_4$. Then, at operation 862, this method uses function $F_5$ that obtains this score and the score of the past hour (which is 12 PM).

Confidence Score Explanation

When an incident is triggered and an investigation is done on the incident, customers can label the incident as 1 (e.g., to indicate being important or severe) or 0 (e.g., to indicate minor issue). An ML classifier is trained that uses features such as incident source, incident target, event type and event time (to name a few) and estimate a class being 1 and its confidence score (e.g., this score is the one to be used). To better understand this, consider a simple example in which someone is knocking on the door. An alarm will raise the incident of door has been knocked with a severity of 10. However, after investigation, the knocking was determined to be a postman. So, in this example, the severity is reduced. This reduction happens by function $F_2$. To do that, the method multiplies the raw severity by the confidence score which is the output of the ML model.

Incidents usually come with the following column names: Event Receive Time, Day Of Week (Event Receive Time) (Day), Hour Of Day (Event Receive Time) (Hour), Event Type, Event Name, Incident Reporting Device, Incident Source, Incident Target, Incident Detail, Incident Status, Incident Resolution, Incident Tag Name, Incident Comments, Incident Category, Attack Technique, Attack Tactic, and Count. As an example, Event Receive Time: Mar. 26, 2023 17:31,
    Day Of Week: 0,
    Hour Of Day: 17,
    Event Type: PH RULE Meterpreter Cobalt Strike Installation SYSTEM LOG,
    Event Name: Windows: Meterpreter or Cobalt Strike Service Installation: System Log.
    Incident Reporting Device: ORDERS-ERP,
    Incident Source:,
    Incident Target: hostName: ORDERS-ERP,
    Incident Detail: service\file\name\ \
    Incident Status: 0,
    Incident Resolution: 1

Incident Tag Name:,
    Incident Comments,
    Incident Category: Security,
    Attack Technique: ["name": "Access Token Manipulation: Create Process with Token", "techniqueid": "T1134.002"]
    Attack Tactic: Privilege Escalation, Defense Evasion, Count: 223

User Vs Host

Inside each host or user, multiples of the same incident could happen. For a host calculation, the method treats the incidents like the incidents are different incidents and just sums their value with other incidents. However, for a user this results in a very high score for users. To avoid this, the method passes some of the same incidents to the function min(5*square root of (incident score, incident score) and then adds this to the total sum. For example, if the incident Brute Force App Login Success has a score of 16.55 that happened 3 times in the same user, then the method adds min (5*square root (3.16.55), 3*16.55). In contrast, for a host, the method adds scores of each incident together (3*16.55). Alternatively, could also change this by having different $F_5$ function for users and hosts.

Figure 9:
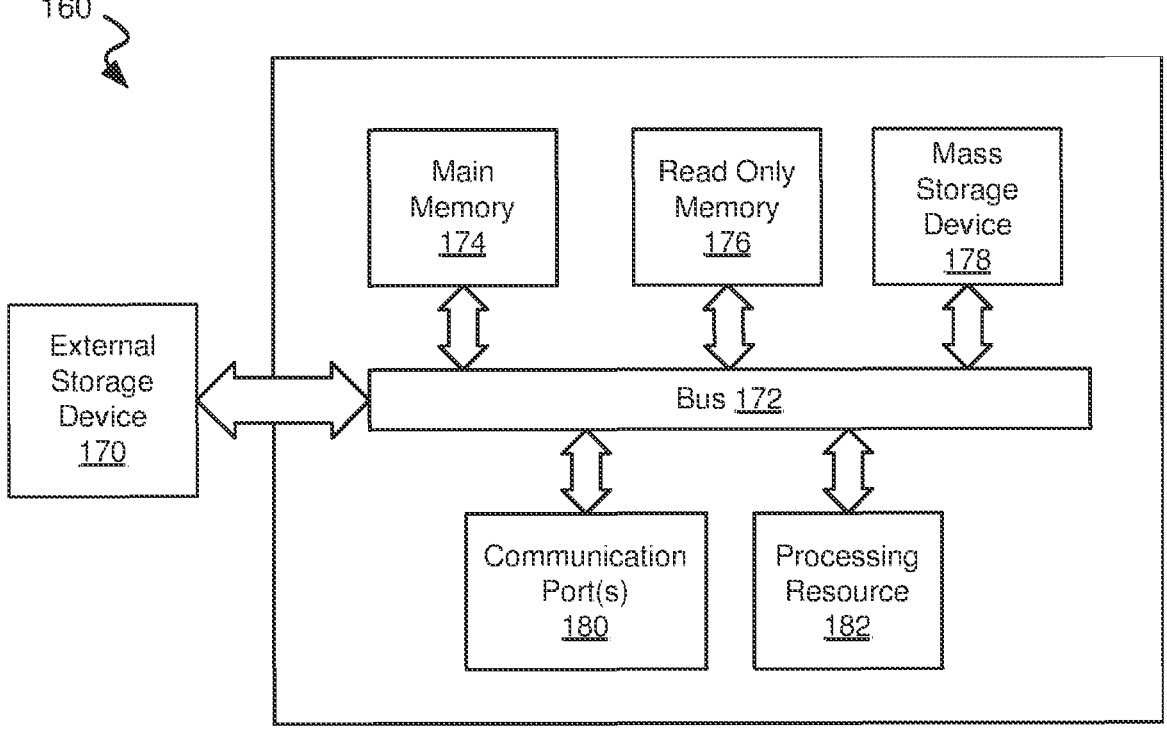
FIG. 9 illustrates an example computer system 160 in which or with which embodiments may be utilized.

Turning to FIG. 9, an example computer system 160 is shown in which or with which embodiments may be utilized. As shown in FIG. 9, computer system 160 includes an external storage device 170, a bus 172, a main memory 174, a read-only memory 176, a mass storage device 178 having non-transitory computer readable medium, one or more communication ports 180, and one or more processing resources (e.g., processing circuitry 182). In one embodiment, computer system 160 may represent some portion of network element 116 and/or network security appliance.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

In conclusion, the present design provides for novel systems, devices, and methods. While detailed descriptions of one or more embodiments of the present design have been given above, various alternatives, modifications, and equivalents will be apparent to those skilled in the art without varying from the spirit of the present design. Therefore, the above description should not be taken as limiting the scope of the present design, which is defined by the appended claims.

What is claimed is:

1. A computer-implemented method for determining a risk
   score for an entity in a network, the computer-implemented method comprising:
   determining incidents including an intrinsic score $s_i$ indicating a first raw severity, a count $c_i$ for a number of occurrences of each incident, and a probability of a true positive occurrence for each incident during a first time period for the entity of the network;
   calculating rarity including a rarity score for each incident for the entity in the network using a first function $F_1(c_i)$; and
   updating, with a machine learning algorithm, the first raw severity to a second severity for each of the incidents of the entity based on a confidence score $p_i$ for each incident using a second function $F_2(s_i, p_i)$ to consider whether each incident is a true positive or false positive with a confidence factor per incident; and
   determining the risk score for the entity based on the first function $F_1(c_j)$, the second function $F_2(s_j, p_j)$, and by combining a score from a previous time-slot and a current estimated score for a current time-slot.

2. The computer-implemented method of claim 1, further comprises:
   updating per-incident score by rarity and severity using a third function.

3. The computer-implemented method of claim 2, further comprises:

adding incident score for the entity and passing a resulting output through a fourth asset importance function for adding diversity.

4. The computer-implemented method of claim 1, wherein
   determining the risk score for the entity is based on using a fifth momentum function, wherein the fifth momentum function is different for a host compared to a user.

5. The computer-implemented method of claim 1, wherein the entity comprises a host or a user.

6. The computer-implemented method of claim 1, wherein calculating rarity for all incidents for the entity in the network comprises obtaining the count c; for each incident and generating a rarity value.

7. The computer-implemented method of claim 1, further comprises:
   reporting a risk score once per a second time period that is less than the first time period.

8. A system comprising:
   one or more processing resources; and
   a non-transitory computer readable medium coupled to the one or more processing resources and having stored therein instructions being executable by the one or more processing resources cause the one or more processing resources to:
   determining incidents including an intrinsic score $s_i$ indicating a first raw severity, a count $c_i$ for a number of occurrences of each incident, and a probability of a true positive occurrence for each incident during a first time period for an entity of a network;
   calculate rarity including a rarity score for each incident for the entity in the network using a first function $F_1(c_i)$;
   utilize machine learning to generate true positive or false positive confidence values for a confidence score for each incident for the entity;
   update the first raw severity to a second severity for each of the incidents of the entity based on the confidence score $p_i$ for each incident for the entity using a second function $F_2(s_i, p_i)$ to consider whether each incident is a true positive or false positive with a confidence factor per incident; and
   determine a risk score for the entity based on the first function $F_1(c_j)$, the second function $F_2(s_j, p_j)$, and by combining a score from a previous time-slot and a current estimated score for a current time-slot.

9. The system of claim 8, wherein the instructions being executable by the one or more processing resources to:
   update per-incident score by rarity and severity using a third function.

10. The system of claim 8, wherein the instructions being executable by the one or more processing resources to:
    add incident score for the entity and passing a resulting output through a fourth asset importance function for adding diversity.

11. The system of claim 8, wherein the
    risk score is determined using a fifth function.

12. The system of claim 11, wherein the fifth function is different for a host compared to a user.

13. The system of claim 8, wherein the entity comprises a host or a user.

14. The system of claim 8, wherein calculating rarity for all incidents for the entity in the network comprises obtaining the count c; for each incident and generating a rarity value.

15. The system of claim 8, wherein the instructions being executable by the one or more processing resources to:

report a risk score once per a second time period that is less than the first time period.

16. A non-transitory computer readable medium having stored therein instructions being executable by one or more processing resources cause the one or more processing resources to:

determining incidents including an intrinsic score $s_i$ indicating a first raw severity, a count $c_i$ for a number of occurrences of each incident, and a probability of a true positive occurrence for each incident during a first time period for an entity of a network;

calculate rarity including a rarity score for each incident for the entity in the network using a first function $F_1(c_i)$ utilize machine learning to generate true positive or false positive confidence values for a confidence score for each incident for the entity;

update the first raw severity to a second severity for each of the incidents of the entity based on the confidence score $p_i$ for each incident for the entity using a second function $F_2(s_i, p_i)$ to consider whether each incident is a true positive or false positive with a confidence factor per incident; and determining a risk score for the entity based on the first function $F_1(c_j)$, the second function $F_2(s_j, p_j)$, and by combining a score from a previous time-slot and a current estimated score for a current time-slot.

17. The non-transitory computer readable medium of claim 16, wherein the instructions being executable by the one or more processing resources cause the one or more processing resources to:

update per-incident score by rarity and severity using a third function.

18. The non-transitory computer readable medium of claim 16, wherein every incident in each category comprises of a tuple of the form (i, c, p) that represent incident's intrinsic score (i), count (c) and a probability (p) of true-positive occurrence.

19. The non-transitory computer readable medium of claim 16, wherein the instructions being executable by the one or more processing resources cause the one or more processing resources to:

add incident score for the entity and passing a resulting output through a fourth asset importance function for adding diversity.

20. The non-transitory computer readable medium of claim 16, wherein the risk score is determined using a fifth momentum function, wherein the fifth function is different for a host compared to a user.

* * * * *